Aug. 30, 1960 B. P. M. SCHWARTZ ET AL 2,950,490
PLANETARY GEAR REVERSING DRIVE MEANS CONTROLLED
BY SNAP ACTION CLUTCH MEANS
Filed Oct. 11, 1957 3 Sheets-Sheet 1

BERNARD P.M. SCHWARTZ
JOHN G.C. AGNEW
Inventors

BERNARD P.M. SCHWARTZ
JOHN G. C. AGNEW

Inventors

BERNARD P.M. SCHWARTZ
JOHN G.C. AGNEW
Inventors

United States Patent Office 2,950,490
Patented Aug. 30, 1960

2,950,490
PLANETARY GEAR REVERSING DRIVE MEANS CONTROLLED BY SNAP ACTION CLUTCH MEANS

Bernard P. M. Schwartz, London, and John G. C. Agnew, Sutton, England, assignors to Thoka Machinery Supplies Limited, a British company, London, England Filed Oct. 11, 1957, Ser. No. 689,559

Claims priority, application Great Britain Oct. 17, 1956

6 Claims. (Cl. 10—138)

The present invention relates to a drive mechanism for a holder for a tap or thread-cutting die for external threads (which will be referred to as "a tap" herein for convenience). The present mechanism is intended for use in tapping equipment and in particular it relates to a tap holder drive mechanism for use in conjunction with a machine having a rotatable spindle with a feed device, which may be manually or automatically operated.

Existing tapping drive mechanisms of the type which adapt drilling machines for tapping operations normally include a longitudinally movable spindle having clutch elements which alternatively engage contra-rotating clutch elements to determine the direction of rotation of the tap holder. The spindle is ordinarily freely slidable and since it must drive the tap forwardly when fed against the work, it follows that the device is constructed to drive the spindle forwardly when the spindle is pressed rearwardly into the housing and to reverse the spindle when it is drawn forwardly out of its housing.

The combined weight of the tapping spindle, tap holder and the tap itself in vertical tapping engages the clutch in the reverse direction during the lowering of the tap drive mechanism onto the work and this continues until the feed of the mechanism against the work causes the reverse drive to be disengaged and the spindle forced upwardly through the neutral position to engage forward drive.

The engagement of the clutch members for forward drive depends on the skill of the operator and a "juddering" or "chattering" results when an inexperienced operator tries to engage or disengage the forward or reverse motions too carefully. When tapping blind holes the motion of the quill of the drilling machine on which the tapping drive mechanism is mounted is arrested by a stop to prevent tap-breakage. The tap which is guided in the thread which it is cutting pulls the tapping spindle out of the mechanism until the clutch engagement becomes too weak to continue driving the tap. The teeth of the driving member of the clutch mechanism then try to re-engage the clutch until the operator raises the drive spindle and thereby engages the reverse drive. The grabbing action of the teeth of the forward driving clutch member is detrimental to the machine, the tapping drive mechanism and the tap itself.

In order to overcome these difficulties the present invention provides a drive mechanism in which there is provided a resilient arresting means acting on the spindle to prevent longitudinal movement of the spindle until a predetermined force in longitudinal direction is applied to the spindle which then snaps over from one driving position to the other. When used in conjunction with a tapping chuck which is equipped with a shank that may move longitudinally in relation to it, but is restrained from such movement in either direction by resilient means, the drive mechanism will reverse the drive to the tap at a predetermined depth when the motion of the feed member of the machine on which it is mounted is arrested by a stop.

Chucks with shanks or adaptors that may move longitudinally in relation to the body are well-known and do not form part of this invention.

The drive mechanism itself may be constructed so as to automatically reverse the tap rotation at intervals, without alteration of the direction of rotation of the spindle of the machine or direction of the feed.

The periodic reversal of the tap has a number of advantages—

(i) The chips cut by the tap are broken off before they can clog in the flutes of the tap.
(ii) Heat generated in the forward cutting movement of the tap has time to dissipate during the reverse movement.

Because of these advantages the strain on the tap is reduced and it is possible to cut fuller threads than can be cut at present by means of automatic tapping equipment.

A tap holder drive mechanism provided by the present invention when constructed to reverse automatically is used with a machine in which the spindle feed per revolution is considerably less than the pitch of the tap and the consequent difference in longitudinal movement between the part of the mechanism attached to the spindle feed and the holder, in which the tap is mounted, is employed for the operation of a built-in reversing mechanism.

This feature of the present invention provides a tap holder drive mechanism, adapted to repeatedly reverse the rotation of the tap holder without reversal of the feed, comprising a housing adapted to be connected to the feed member of a machine, a tap holder drive spindle mounted therein for limited longitudinal movement, a tap holder mounted on the spindle and longitudinally movable in relation thereto, a resilient means arranged between the tap holder and the drive spindle to oppose relative longitudinal movement therebetween, a drive input member for connection to the spindle of a machine, a reversing mechanism arranged between the input member and the tap holder drive spindle, the reversing mechanism including contra-rotating gear elements, clutch means mounted on the tap holder spindle and adapted to engage with elements of the reversing mechanism rotating in opposite directions depending on the longitudinal position of the drive spindle and resilient arresting means to prevent longitudinal movement of the spindle until the force exerted by the resilient means between the tap holder and the drive spindle exceeds a predetermined value.

In the accompanying drawings—

Figure 1:
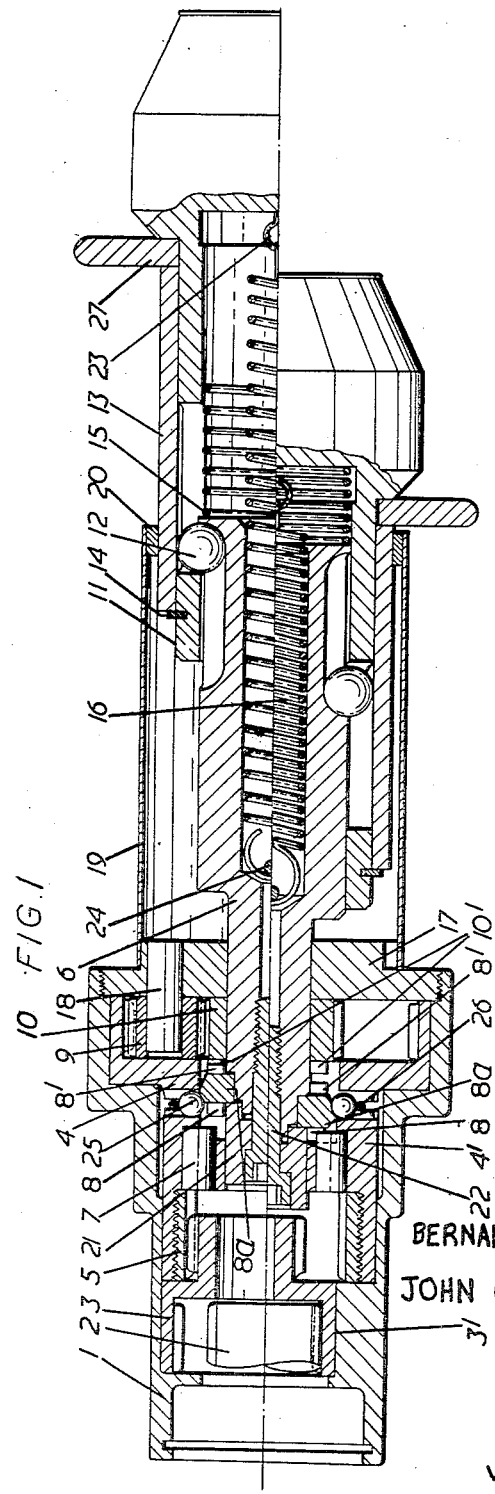
Figure 1 shows a tapping chuck drive mechanism in section, the upper and lower halves respectively showing the chuck in its furthest position from and closest position to the machine spindle.

The mechanism is held in a housing 1 for attachment to the machine feed member. The drive to the mechanism is through a spur gear 2 fitted to the spindle of the machine. This drives the input member 3, which is a combined internal and external spur gear, eccentrically and rotatably mounted in the housing 1 at 3[1].

The gear 3 acts as a reduction gear, in turn driving the reversing gear 4 through the toothed insert 5 threaded into a neck portion 4[1] of that gear. The forward drive of the tapping spindle 6 is through two clutch pins 7 mounted in the reversing gear 4. The clutch pins 7 engage clutch teeth 8 on the spindle 6, as shown in the lower half of Figure 1. The reverse drive of the tapping spindle 6 is through two idlers or planet gears 9 which are fixed in relation to the casing 1 and are driven by the reversing gear 4. The gears 9 in turn drive a sun gear 10, freely mounted on the spindle 6. The gears 4, 9 and 10 thus form an epicyclic gear system, of which the reversing gear is the annulus. The sun gear 10 has clutch teeth $10^1$ that can engage the clutch teeth $8^1$ in the position shown in the upper half of Figure 1 to drive the spindle 6 in the reverse direction. The tapping spindle 6 drives a tapping chuck 11, which is the form of tap holder used in the present construction, through three balls 12, which provide an almost frictionless spline between these two parts. The balls 12 are confined in their grooves by a sleeve 13 which in turn is held by a split ring 14. The length of the splined connection between the chuck 11 and the spindle 6 is such as to permit relative movement between these two parts in excess of the length of the longest screw thread which the mechanism is intended to cut. The longitudinal position of the tapping chuck 11 in relation to the housing 1 is controlled by a compression spring 15 and a tension spring 16 which are so selected that the tapping chuck 11 is in its free equilibrium position held only about ⅜″ forward from the position shown in the lower half of Figure 1. In order to prevent dirt from entering the mechanism a lock nut 17 carrying bearing pins 18 of the planet gears 9 has a cover sleeve 19 fitted to its shoulder. This cover sleeve 19 carries a seal 20 rubbing on the sleeve 13. In order to make it possible to assemble the tapping spindle mechanism easily, the tapping spindle 6 is provided with a false nose 21 which holds the clutch teeth 8 and $8^1$ and cam members 8a on a hexagon milled portion of the tapping spindle 6 which is in turn held by a socket screw 22.

In operation, the tapping drive spindle is clamped securely to the tapping machine by the housing 1 and receives the drive for the tapping chuck and the tap through the spur gear 2. The sliding member of the machine is fed in rapid traverse motion against the workpiece until the compression spring 15 is compressed as shown in the lower half of Figure 1. At this instant the rapid traverse motion of the machine is reduced by the operator or automatically to feed motion which is considerably slower than the forward movement of the tap which continues to follow the lead of the thread it has already cut while the tapping chuck 11 is still pushed forward by the compression spring 15. Through the continued forward motion of the tap the tapping chuck 11 pulls on the tension spring 16 through the hook 23 and the tension spring 16 in turn exerts a pull on the tapping spindle 6 through the pin 24. The tapping spindle 6 is prevented from moving forward by the cam member 8a which is restrained by balls 25 held in apertures in the reversing gear 4 and pressed inwardly by a ring spring 26. When the pull on the tapping spindle 6 exceeds the resistance offered by the balls 25 against the cam member 8a, the tapping spindle 6 will snap over and move forward to disengage the clutch teeth 8 from the clutch pins 7. The forces exerted by the ring spring 26 and the tension spring 16 are so balanced that the clutch teeth $8^1$ immediately proceed to engage the teeth $10^1$ of sun gear 10. The drive to the tapping spindle, the tapping chuck and the tap is now in the reverse direction and at an increased speed by reason of the difference in diameter between the gears 4 and 10. Whereas the housing 1 continues uninterruptedly forward in feed motion, the tapping chuck 11 returns rapidly towards it loading the compression spring 15. When the pressure exerted by the compression spring 15 is sufficient to exceed the restraining force of the spring loaded balls 25 against the cam member 8a, the tapping spindle 6 moves backward, the clutch teeth $8^1$ disengage from the teeth $10^1$ and the teeth 8 immediately engage the clutch pins 7. The tap is now again driven forward into the work until it has overtaken the housing 1 (which advances steadily in feed motion) sufficiently to operate the automatic clutch mechanism for reverse motion. The reciprocating motions of the tapping chuck 11 continue until the feed motion is reversed, as for instance by a limited switch operating disc 27 striking a lever (not shown) which operates a switch to cause the feed motion transmitted by the machine to the housing 1 to be switched over to rapid return motion. Through a further limit switch, which need not be operated by the tapping drive spindle mechanism, the rapid return motion is arrested at a suitable point within the range of travel permitted by the ball spline. A time relay may be operated simultaneously which will re-start the rapid motion after the tap has been withdrawn from the work. This automatic control system does not, however, form a part of the mechanism provided by the present invention.

When the feed motion of the machine is changed to rapid return motion, the reversing clutch is operated by the increased pull of the tension spring 16 to reverse the drive to the tap. The rapid return motion of the machine on which the swarf-breaking automatic tapping chuck drive mechanism is used may be considerably faster than the withdrawal of the tap from the thread it has cut. The length of the splined connection between the spindle 6 and the chuck 11 permits the housing to be withdrawn by the machine feed to a distance in excess of the thread cut by the tap, so that the housing may be withdrawn in one movement and the withdrawal of the tap from the work subsequently completed. The pull on the tap is greatest when it is still fully engaged in the hole it has cut and this tension cannot damage the thread. By the time the tap emerges from the hole, the tension spring 16 may again be almost balanced by the compression spring 15 so that there is no danger of damaging the threads in the workpiece.

The tapping chuck drive mechanism may be employed with a feed that may coincide with the feed needed for the economic drilling of a core hole. This makes it possible to mount multi-heads on the operating machine to enable it to drill and tap consecutively, using essentially similar automatic cycles for both operations.

It will be appreciated that the function of the spring-loaded balls 25 acting on the cam 8a is to act in the manner of a snap-over toggle mechanism so as to ensure that the spindle 6 moves substantially instantaneously from forward to reverse drive and vice versa when the longitudinal force on the spindle exceeds the value necessary to permit the cam 8a to override the balls. The snap-action function could therefore be equally provided by other devices of a like kind in substitution for the cam 8a and spring-loaded balls 25.

In a modified form of construction the compression spring 15 may be omitted from the mechanism described. The mechanism is then employed with a tapping chuck of the known type employing an internal compressible spring.

One of the advantages of the drive mechanism of the present invention arises in the tapping of very tough materials. It is common practice to tap these by hand.

This method has the serious disadvantage that after each reversal of the tap the chips have to be started again, when the point of initial chip contact is always at the apex of the cutting edges of the tap, the worst possible condition. Once the chip starts sliding over the tool face (inside the flute of the tap) the point of chip contact moves away from the apex.

The immediate arrest of the cutting force in the present drive mechanism allows the tap to leave behind a chip formation approaching that of a chip in full flow. When the tap recommences the cut it has to take the full shock load of an interrupted cut, but it takes this load, away from the weakest point of the cutting formation, in a position where the cross-section is strong enough to withstand it.

Another of the advantages of periodic reversals of the tap is that much of the heat generated in the forward cutting movement of the tap has time to dissipate during the reverse movement so as to avoid consequent damage to the tap.

When materials of great toughness are tapped it is important that the length of each cutting stroke is kept short to avoid overheating the tap before completion of the forward stroke. This condition can be fulfilled by the drive mechanism already described, with the exception of the initial cutting stroke from the rest position. This may prove too long when the tapping of materials of exceptional toughness is attempted. This difficulty is overcome by using a compression spring additional to the spring 15 to exert an outward force on the chuck during the initial stroke only.

Figure 2:
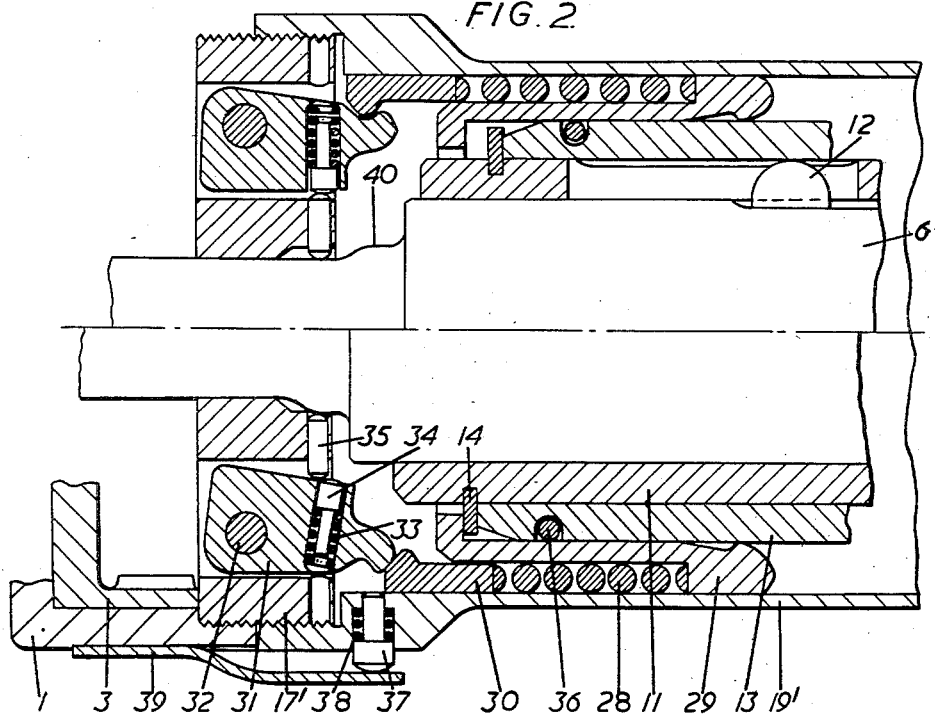
Figure 2 is a similar section of part of a modified construction of tapping chuck drive mechanism, intended for use for tapping very tough materials.

The construction shown in Figure 2 is additional to the mechanism of Figure 1 and is located within the modified cover sleeve 19¹ and the purpose of the modification is to ensure that the first cut of the tap is not excessively long so as to prevent destruction of the tap.

Referring to Figure 2, an additional compression spring 28 is firmly attached to a shouldered bush 29 at one end and to a sleeve 30 at the other.

These parts slide freely in the modified cover sleeve 19¹ which is screwed on the modified lock nut 17¹. The lock nut 17¹ is slotted to carry latches 31 which are hinged on pins 32. Springs 33 bearing against actuating pins 34 are inserted in blind holes in the latches 31. Sliding pins 35 are mounted in holes in the lock nut 17¹ and these are moved lengthwise by a cam surface 40 as the modified tapping spindle 6¹ moves backwards or forwards. The shouldered bush 29 has an internal annular ratchet-shaped groove for engaging a split ring 36 which is held in an annular groove cut in the sleeve 13.

The equilibrium position of the tapping chuck 11 at the start of the automatic tapping cycle is now controlled by the compression spring 28 in addition to the compression spring 15 and the tension spring 16. In this position the sleeve 30 abuts the ends of the latches 31 which prevent its inward movement. The compression spring 28 is arranged so that in this position its force augments the pull of tension spring 16 when the tapping spindle 6¹ is in the drive position with the clutch pins 7 engaging the clutch teeth 8 as shown in the lower half of Figure 2. The compression spring 28 is thus adjusted so that only a slight forward motion of the tapping chuck 11 will take place before the cam member 8a overcomes the resistance offered by the spring-loaded balls 25 causing tapping spindle 6¹ to snap over and move forward so that the tap is driven in the reverse direction.

In operation, the feed member of the tapping machine is fed in rapid traverse motion against the workpiece until the compression spring 28 is compressed as shown in the lower half of Figure 2. At this instant the rapid traverse motion of the machine is reduced to feed motion which is considerably slower than the forward movement of the tap which continues to follow the lead it has already cut while the compression spring 28 is pushed against the shouldered bush 29 which in turn is pushed against the split ring 14 on the shank of the tapping chuck 11. Through the continued forward motion of the tap after the free position of the tapping chuck 11 is regained, the cam member 8a soon overcomes the resistance offered by the spring-loaded balls 25 and thereby engages the reverse drive.

Snapping forward into the reverse drive position under the force of the tension spring 16, the tapping spindle 6¹ frees the sliding pins 35 which slide down the cam face 40 and are simultaneously pushed radially inwards by the springs 33 through the actuating pins 34. Whereas the housing 1 continues uninterruptedly in feed motion, the tapping chuck 11 returns rapidly towards it. The split ring 14 on the tapping chuck 11 pushes back the shouldered bush 29 together with the compression spring 28 and the sleeve 30. Since the pins 35 have moved, the latches 31 can swing back and the sleeve 30 overcomes the resistance of the light springs 33 and lifts the latches into the position shown on the top half of Figure 2, the spring 28 being unstressed and the sleeve 30 latched against outward movement. The operation of the automatic clutch mechanism is now controlled by the compression spring 15 and the tension spring 16 exactly as described in relation to Figure 1 until, as before, the limit switch operating disc 27 strikes a lever (not shown) which causes feed motion of machine transmitted to housing 1 to be switched over to rapid return motion.

The rapid return motion of the machine is selected considerably faster than the withdrawal of the tap from the hole it has cut. During the return stroke the tap pulls the tapping chuck 11 and, with it, the sleeve 13 away from housing 1. During this movement the split ring 36 is taken along by the sleeve 13 and draws the sleeve 30 out of engagement with the latches 31, which swing inwardly the pins 34.

For resetting the drive mechanism ready for the next tapping cycle, pins 37 are provided and these are spring-loaded outwardly by springs 38 against spring clips 39. The pins 37 must be pushed into the path of the sleeve 30 by depression of the clips 39, either manually or by contact with a fixed part of the machine. The pins 37 then act as an abutment for the sleeve 30. Then the tapping chuck 11 is pushed by means of the switch operating disc 27 towards housing 1 thereby compressing the spring 28 and causing the tapping spindle 6¹ to snap over into the drive position which simultaneously swings the latches 35 out into the position shown in the lower half of Figure 2.

This modified design is not suitable for use with soft materials because the shortened initial cutting stroke of the tap does not allow it to cut a deep enough thread to exert the pull necessary to overcome the resistance to the reversal of the drive offered by the spring-loaded balls 25.

Figure 3:
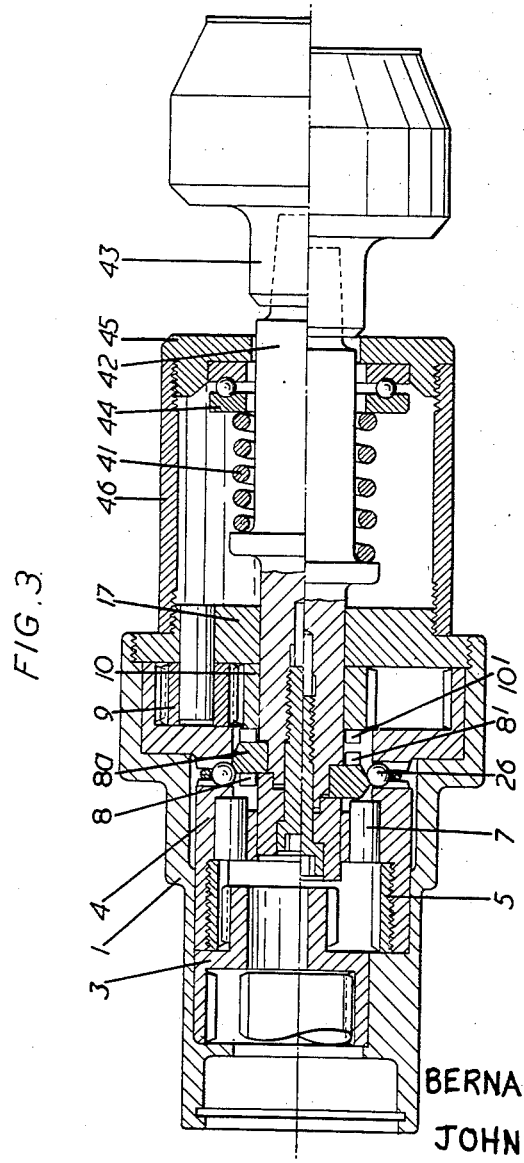
Figure 3 is a similar section of a further modified construction.

The construction of drive mechanism shown in Figure 3 is not adapted of itself to reverse the tapping direction without reversal of the feed direction. It does, however, have the function that the tap is always rotating in the forward direction when it comes into contact with the work and the drive mechanism may be employed to provide a repeated reversal of drive by the utilisation of a spring-loaded tap holder of known kind, as will be referred to below.

The upper end of the drive mechanism is constructed in exactly the same manner as the same part of the mechanism shown in Figure 1. In Figure 3 like reference numerals are applied to like parts shown in Figure 1 and it is unnecessary to redescribe their action.

In this construction a modified tapping spindle 42 is pressed rearwardly by means of a spring 41 located between a shoulder on the spindle and a thrust race 44, supported by a member 45 threaded into a cover sleeve 46.

The spring 41 is chosen to balance the combined weight of the spindle 42 and the tapping chuck 43 when used in the vertical position and at the same time to provide sufficient force to raise the spindle against the resistance offered by the balls 25 to engage forward drive, when the spindle is unsubjected to longitudinal pull. This, of course, ensures that the tap is rotating in the forward direction when it contacts the work.

Figure 4:
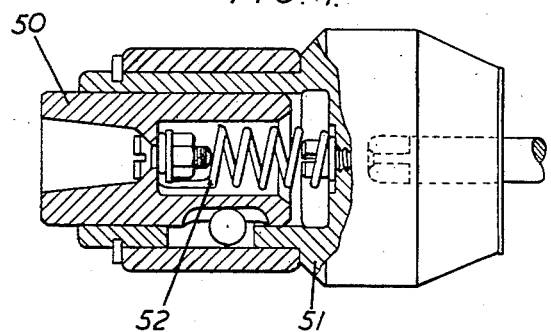
Figure 4 is a section of a tapping chuck.

In order to produce the repeated reversing motion provided by the constructions shown in Figures 1 and 2, the special type of chuck shown in Figure 4 is mounted on the spindle. This chuck is a commercially available article and comprises a shank 50 connected to the holder 51 by means of a ball spline. The shank 50 and the holder 51 are connected to each other by a spring 52 which acts as both a tension spring and a compression spring, so that it will tend to resist any longitudinal displacement of the holder 51 from the neutral position shown in the drawing.

It will be seen that the chuck then performs the same function as the parts 11–16 shown in Figure 1. The spring 52 will be effective to apply a pull or push on the spindle sufficient to effect longitudinal movement for reversal of rotation, when the distance between the holder 51 and the feed member of the machine has increased or decreased sufficiently.

We claim:

1. In a tap holder drive mechanism for connection to the feed member of a machine tool and adapted to be driven from the spindle of the machine tool, the combination of a housing, an input drive member rotatably mounted in said housing, a tap holder drive spindle mounted for longitudinal movement between alternative positions in said housing, a ring gear in said housing driven by said input drive member, a sun gear freely rotatably mounted about said tap holder drive spindle within said housing, planetary gears mounted on fixed spindles in said housing and meshing with said ring gear and said sun gear, clutch means on said spindle and said gears for alternately clutching said tap holder drive spindle to said ring gear and said sun gear in said alternative positions of said spindle to drive said spindle in opposite directions, a cam member carried by said tap holder drive spindle, resilient catch means carried by said ring gear and coacting with said cam to prevent longitudinal movement of said tap holder drive spindle until longitudinal force exerted on said tap holder drive spindle is sufficient to force said cam past said resilient catch means.

2. The combination as claimed in claim 1, wherein the resilient catch means comprises a plurality of balls, said ring gear having radial apertures therein in which said balls are positioned and resilient means restraining said balls against outward radial movement.

3. The combination claimed in claim 1, in which said spindle has a shoulder thereon, and further including resilient means arranged between the housing and said shoulder to provide sufficient force on the spindle to override said resilient catch means and engage said spindle for drive with said ring gear when said spindle is unsubjected to an outward pull, whereby it is ensured that the spindle is in forward drive on engaging the work.

4. The combination as claimed in claim 1, further including a compression spring and a tension spring arranged between the drive spindle and the tap holder and adapted to exert a longitudinal force on the spindle in a direction depending on the direction in which the holder has been displaced from an equilibrium position.

5. The combination claimed in claim 4 incorporating a further resilient means arranged to exert a forward force on the tap holder at the beginning of a tapping cycle of the mechanism and means for rendering said spring inoperative after the first reversal of drive to the tap holder spindle.

6. The combination claimed in claim 5 incorporating as the further resilient means an additional compression spring mounted to act against the tap holder, the rear end of the spring carrying a sleeve abutting on latch members which are forced radially outwards by a cam surface on the spindle, the said latch members being freed for radially inward movement against resilient resistance by longitudinal movement of the spindle in the forward direction to permit the sleeve to pass the latch members and to be held by them in a position in which the additional compression spring is inoperative.

References Cited in the file of this patent

UNITED STATES PATENTS

| 824,085 | Thomas | June 19, 1906 |
| 1,896,752 | Raule | Feb. 7, 1933 |

FOREIGN PATENTS

| 519,578 | Belgium | Oct. 29, 1953 |